(12) United States Patent
Honan et al.

(10) Patent No.: US 9,003,879 B1
(45) Date of Patent: Apr. 14, 2015

(54) MEASURING CUP ASSEMBLY

(71) Applicant: Union Street Brand Packaging, LLC, Northborough, MA (US)

(72) Inventors: David G. Honan, Concord, MA (US); Isaac Haverlick, Brighton, MA (US); Shane Yellin, Dover, MA (US)

(73) Assignee: Perimeter Brand Packaging, LLC, Northborough, MA (US)

( * ) Notice: Subject to any disclaimer, the term of this patent is extended or adjusted under 35 U.S.C. 154(b) by 255 days.

(21) Appl. No.: 13/855,852

(22) Filed: Apr. 3, 2013

Related U.S. Application Data

(60) Provisional application No. 61/620,154, filed on Apr. 4, 2012.

(51) Int. Cl.
G01F 19/00 (2006.01)
G01F 25/00 (2006.01)
G01F 23/02 (2006.01)

(52) U.S. Cl.
CPC ..................... G01F 23/02 (2013.01)

(58) Field of Classification Search
USPC .......................... 73/426, 427, 1.73
See application file for complete search history.

(56) References Cited

U.S. PATENT DOCUMENTS

| 2,141,744 | A | | 12/1938 | Evens | |
|---|---|---|---|---|---|
| 2,762,526 | A | * | 9/1956 | Gilmour | ........................ 141/95 |
| 2,804,103 | A | | 8/1957 | Wall | |
| 3,347,420 | A | * | 10/1967 | Donoghue | .................... 222/129 |
| 4,269,319 | A | | 5/1981 | Rubens | |
| 5,881,894 | A | | 3/1999 | Gargano | |

FOREIGN PATENT DOCUMENTS

| JP | 08113252 A | | 5/1996 |
|---|---|---|---|
| KR | 2014005978 U | * | 12/2014 |

* cited by examiner

*Primary Examiner* — Lisa Caputo
*Assistant Examiner* — Jamel Williams
(74) *Attorney, Agent, or Firm* — Brian M. Dingman; Dingman, McInnes & McLane, LLP

(57) ABSTRACT

A measuring cup assembly with a light-pervious cup, a film at least partially disposed on the cup, the film defining a light-impervious region and a light-pervious region, the cup at least partly viewable through the light-pervious region, and at least one volume dispensing indicator that is part of the film light-impervious region and that traverses a light-pervious region to create a visual demarcation, each volume dispensing indicator indicating a volume of product that has been dispensed into the cup. Each light-pervious region is configured to provide visual detection of the at least one volume dispensing indicator, as well as the dispensed product, from a side of the measuring cup assembly.

20 Claims, 22 Drawing Sheets

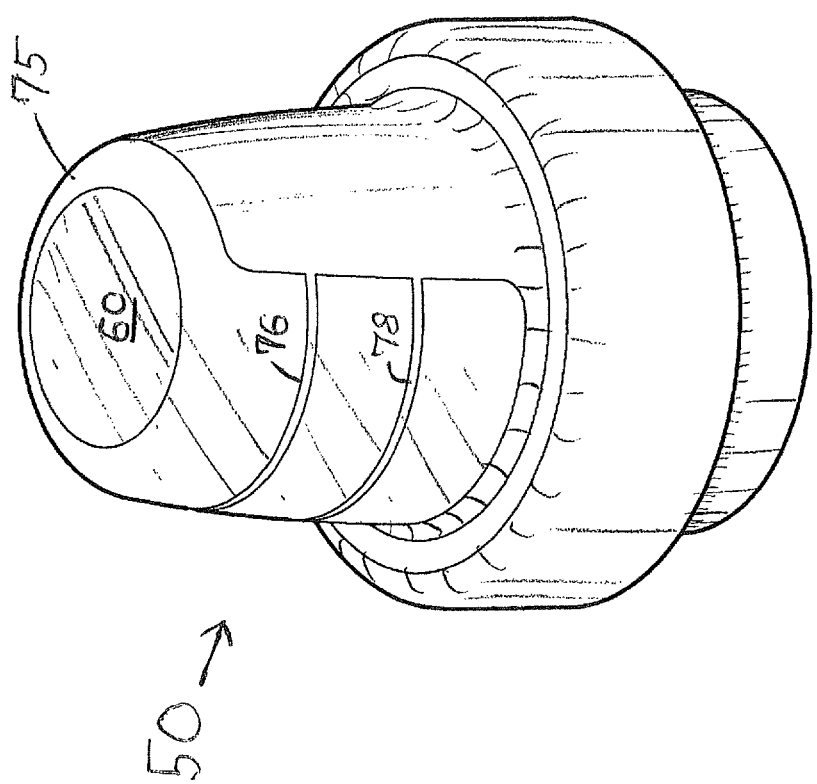

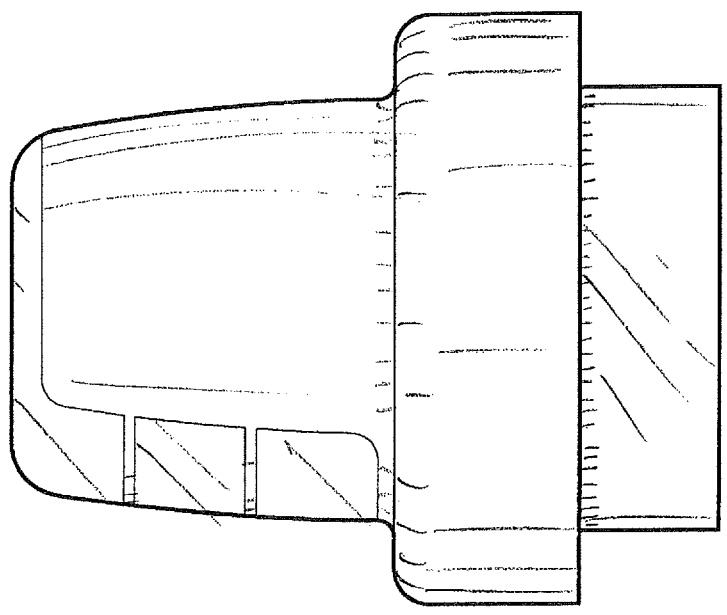

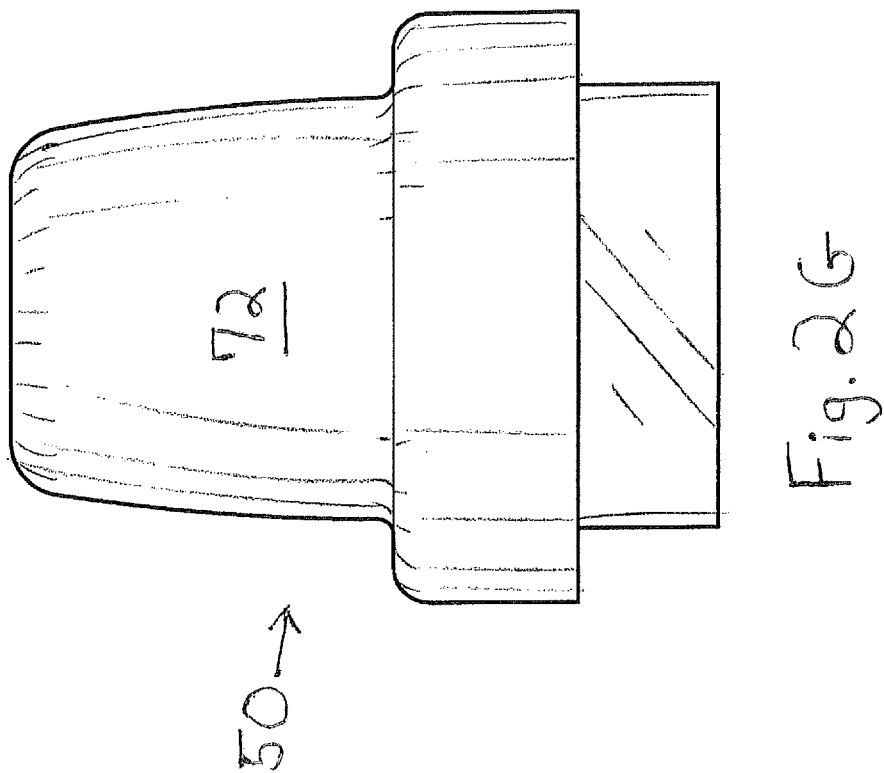

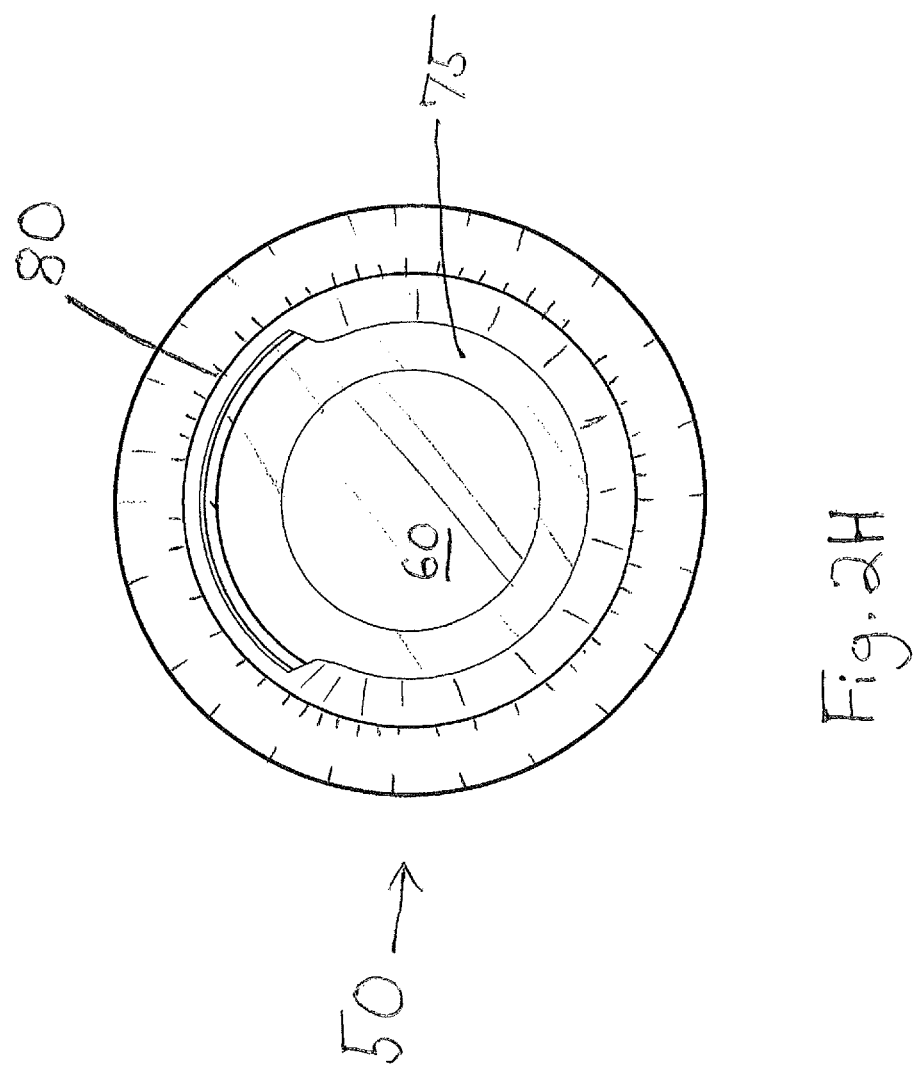

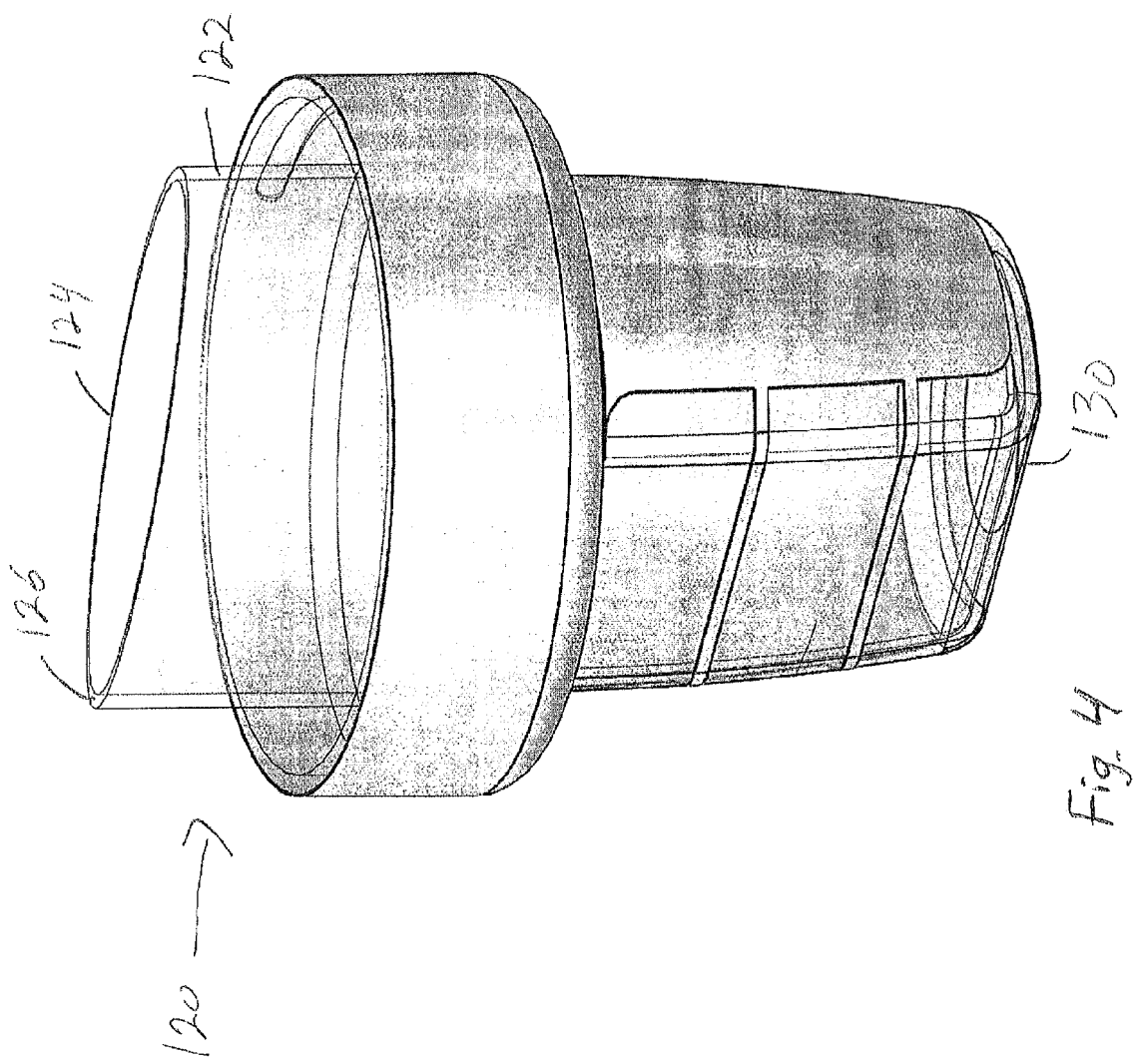

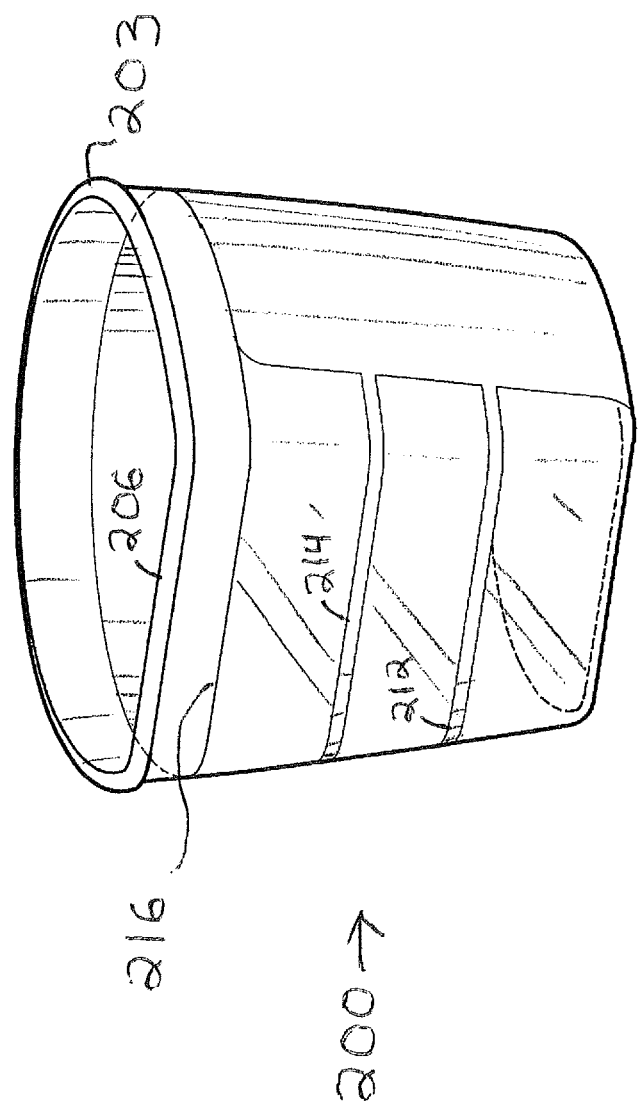

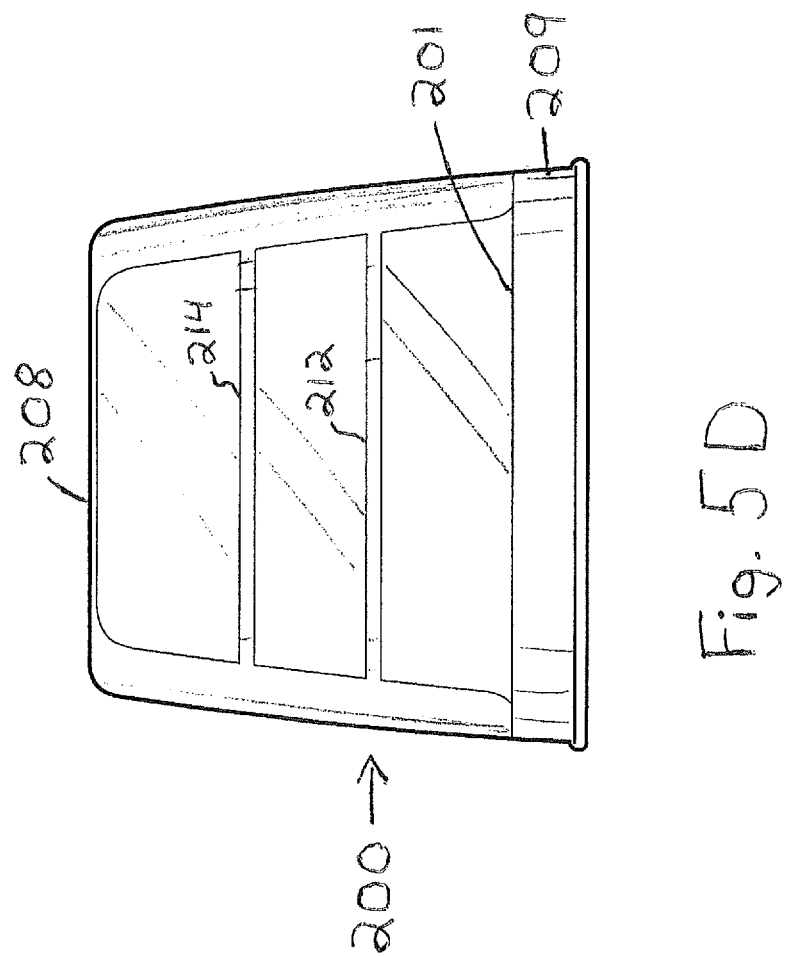

MEASURING CUP ASSEMBLY

CROSS-REFERENCE TO RELATED APPLICATION

This application claims priority of Provisional Patent Application Ser. No. 61/620,154, filed on Apr. 4, 2012, the contents of which are incorporated herein by reference.

BACKGROUND

Liquids and flowable powders and granular materials such beverages, detergents, over the counter medications and pesticides as well as many other substances requiring airtight seals, are sometimes packaged with measuring cups. The measuring cup provides the user with a way to measure the contents to the desired or prescribed amount.

SUMMARY

Embodiments of the present innovation relate to a measuring cup and a cover assembly, for measuring flowable product dispensed from a container for the product. In one arrangement, the measuring cup or cover assembly includes an opaque film that defines a window, and a transparent cup at least partly viewable through the window. The film includes one or more volume dispensing indicators that guide a user to dispense a particular volume of product from the container. Furthermore, the window defined by the film allows the user to view the dispensed product and the volume of dispensed product from the outside or the inside of the measuring cup or the cover assembly. Accordingly, the window focuses the user's attention toward the side of the measuring cup or cover assembly, and allows the user to dispense an accurate amount of product from the container for a particular application.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

FIGS. 2A-2I illustrate a measuring cup assembly.
FIG. 4 illustrates another measuring cup assembly.
FIGS. 5A-5I illustrate another measuring cup assembly.

DETAILED DESCRIPTION

Figure 1A:
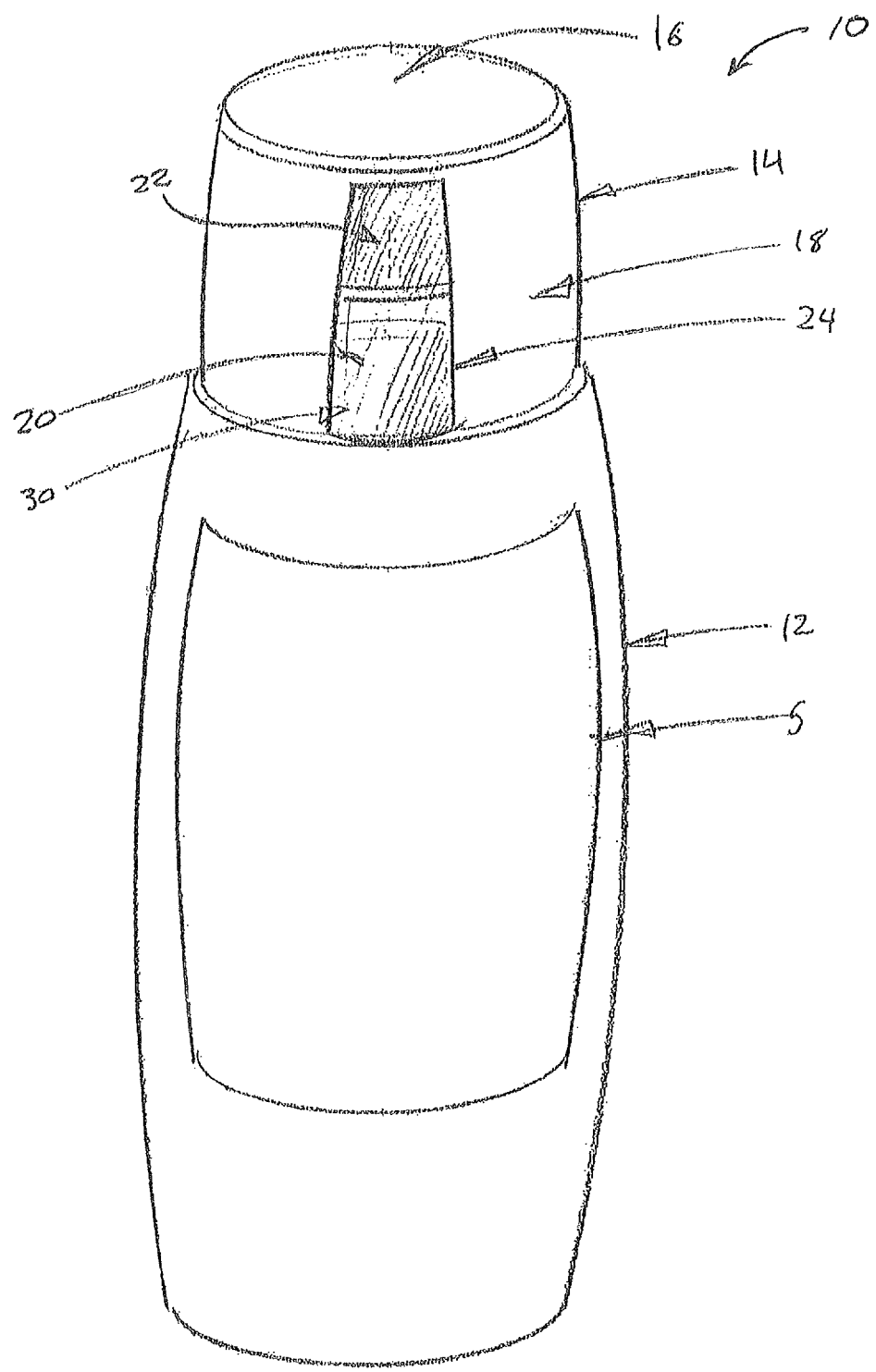
FIG. 1A illustrates a container assembly having a cover assembly, in one arrangement.
Figure 1B:
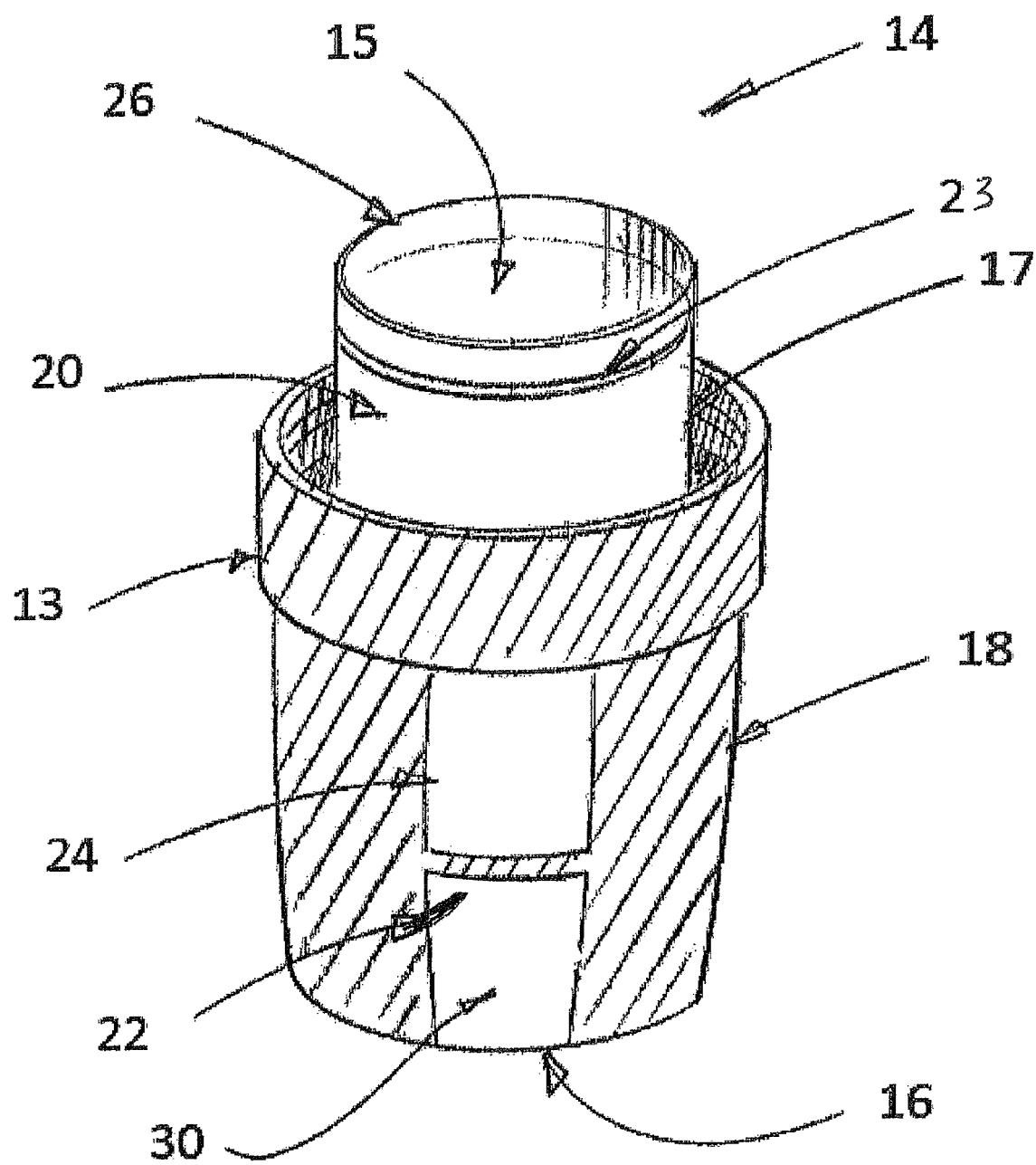
FIG. 1B illustrates the cover assembly of FIG. 1A.

FIGS. 1A and 1B illustrate one example of the subject innovation. Container assembly 10 includes container 12 that holds a flowable substance such as a liquid, powder or granular solid. Cover assembly 14 acts to close the open top of container 12. Assembly 14 also can be used as a measuring cup for the container contents. Cover assembly 14 comprises cup 20 that is made of a transparent or translucent material so that it is light-pervious. The cup can be made of a plastic material by injection molding or other processes known to those skilled in this field. Plastic film 18 covers some or all of the outside of the cup. The film is typically but not necessarily a shrink wrap film made from a light-pervious clear or translucent material. The film is printed or otherwise carries inks or other substances that make the printed areas opaque or at least less pervious to light. This creates a film that defines one or more generally clear areas that can be thought of as windows. Alternatively, as described below, the windows can be created by removing portions of the film.

Film 18 defines one or more volume dispensing indicators, two such indicators 22 and 23 illustrated in this example. When there are two or more volume dispensing indicators, one or more of them can be molded into the cup as illustrated by volume dispensing indicator 23. In each instance, at least one such volume dispensing indicator is part of the film. In this case, volume dispensing indicator 22 comprises a thin narrow straight region of the film that is printed in the same manner as the other opaque regions of the film. Since region 22 crosses the clear window, it serves to visually define two windows 24 and 30.

Cover assembly 14 defines cup top 16 that is flat so that it also acts to support the cover assembly in an upright position as shown in FIG. 1B to expose the internal volume 15 of cup 20. The contents of container 12 can then be poured into the cup. Indicators 22 and 23 serve as visual indicators of the volume the material that has been poured into the cup. The particular volume or volumes demarcated by these indicators would typically be established by the product manufacturer. As one simple example, for use with liquid laundry detergent there may be volume indicators for small, medium and large loads.

These figures also illustrate a feature wherein cover assembly 14 integrally defines a projecting annular lip 13 with internal threads 17 that are constructed and arranged to mate with threads that are on the outside of the neck of container 12. The cup can alternatively carry the threads on the outside near the open bottom, in which case the cup will engage with threads carried on the inside diameter of an lid-engaging portion of the container. Both of these are well-known means of engaging a cover assembly with a container and so will not be further described. In the present innovation, the film may or may not cover some or all of lip 13 as desired either for volume indicating purposes or for other purposes such as to create a decorative outside surface that is accomplished by printing the film. Because the cup is clear and the windows are as well, the cup contents can be seen from the outside of the cup or the inside of the cup.

Figure 2A:
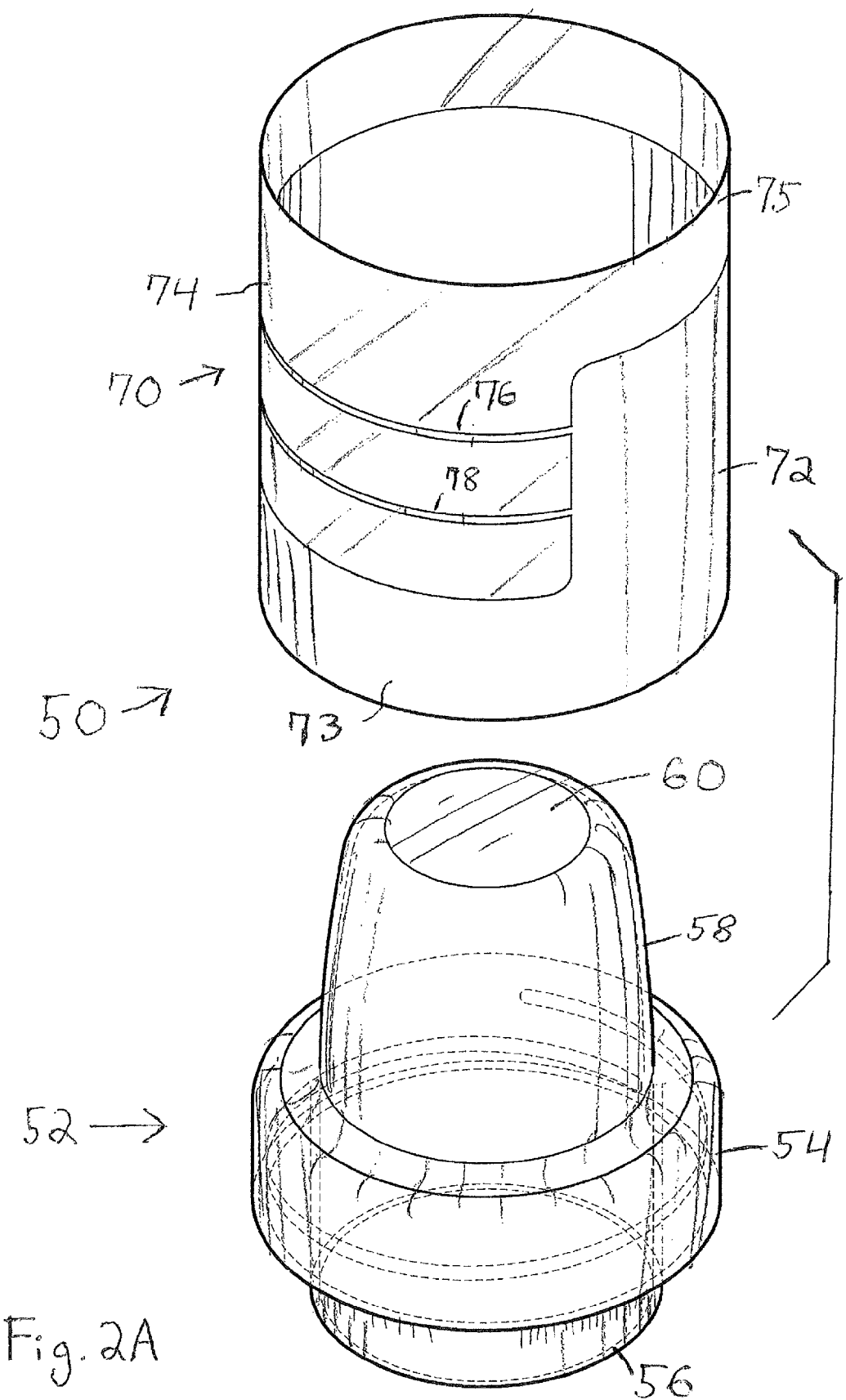
Figure 2B:
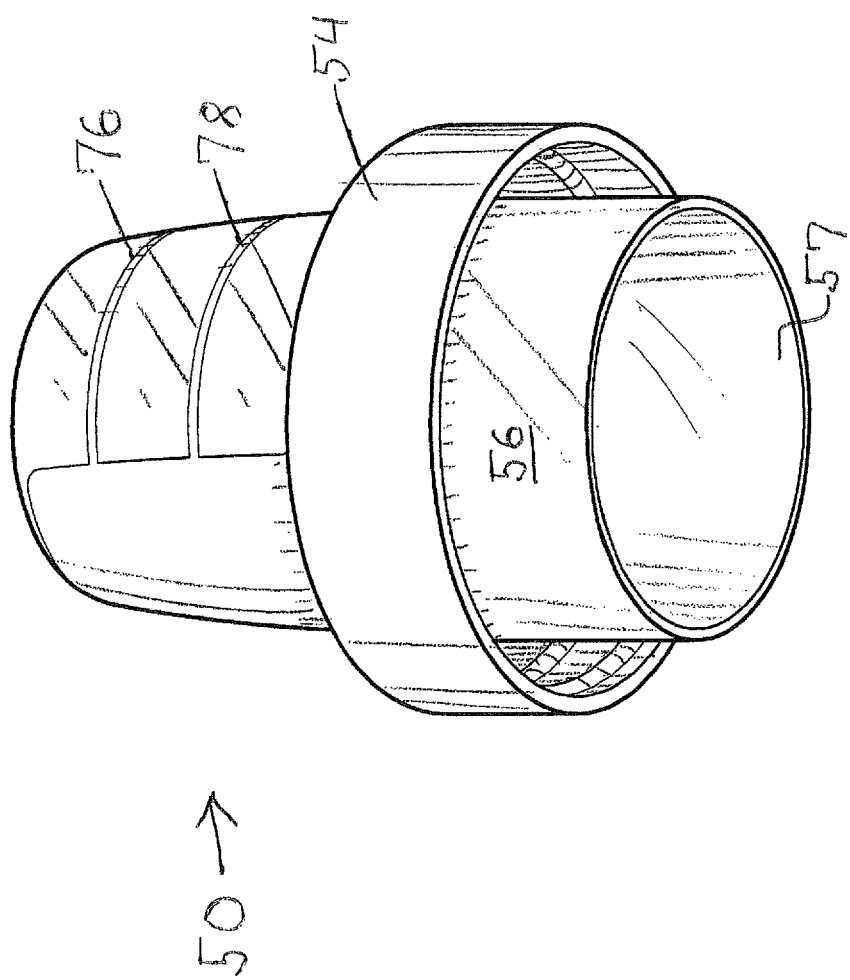
Figure 2F:
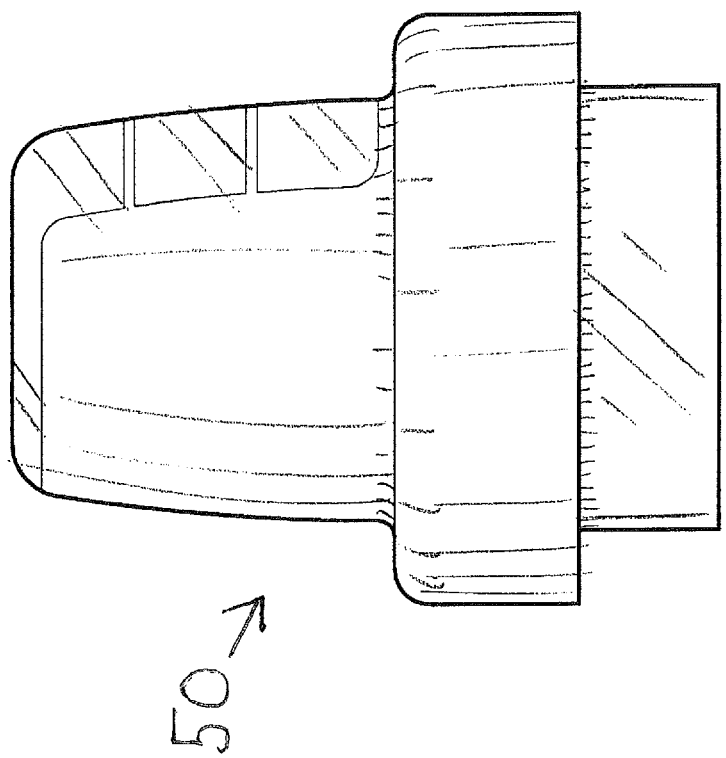
Figure 2I:
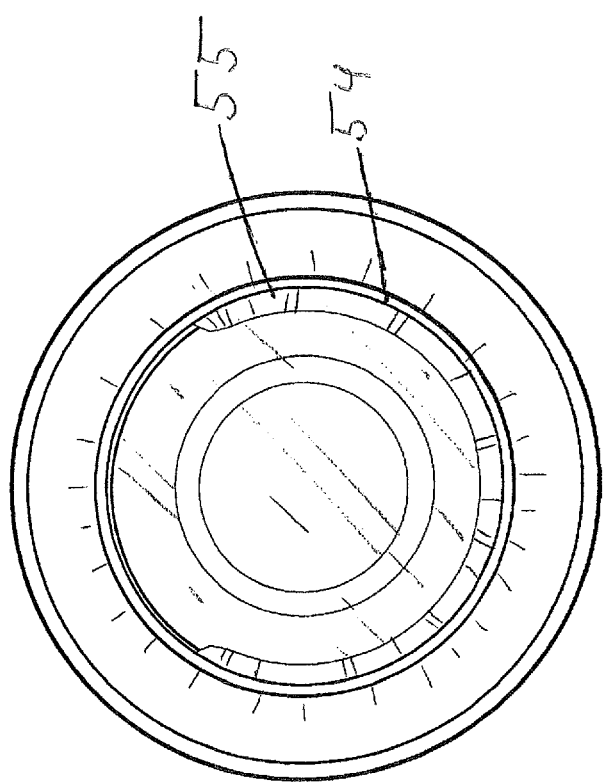

Another example of the subject innovation is shown in FIGS. 2A through 2I. Measuring cup assembly 50 comprises clear molded cup 52 and shrink wrap film 70. FIG. 2A shows the two parts before they are assembled by slipping the film over the cup and then heating the assembly to shrink the film. Film 70 comprises opaque or colored/printed portion 72 and clear or translucent portion 74. Volume dispensing indicators 76 and 78 comprise thin straight regions of opaque portion 72 that cross clear portion 74. In this example, there is also a band 75 of clear film at the top of film 70. Likewise there is an opaque band 73 at the bottom of the film. Cup 52 comprises closed top portion 58 with flat top 60 and extension portion 56 that is below threaded lip 54 and so will extend into the container. This extension portion increases the interior volume of the cup as compared to a cup that did not extend beyond lip 54. A flowable substance can be poured into open volume 57.

In this case, film 70 is constructed and arranged to extend over the entirety of portion 58 but not top 60 and the entire outside of lip 54. This is not a limitation of the innovation, however. The film could extend over the entire portion 58 or less of it than shown in this example, and can extend over none of, part of, or all of lip 54. When lip 54 carries internal threads, the film cannot extend over the lip into extension portion 56 as the film would block access to the threads. However, when the cup does not carry such a lip, the film can extend over some or all of extension portion 56.

In the assembled state shown for example in FIG. 2C, top clear band 75 is located in the shoulder region between portion 58 and top 60. Indicators 76 and 78 are arranged such that they are parallel to top 60 such that when the top is placed down on a flat surface or held so that the top is horizontal, the volume indicators are also horizontal so that an accurate volume can be dispensed.

Figure 3D:
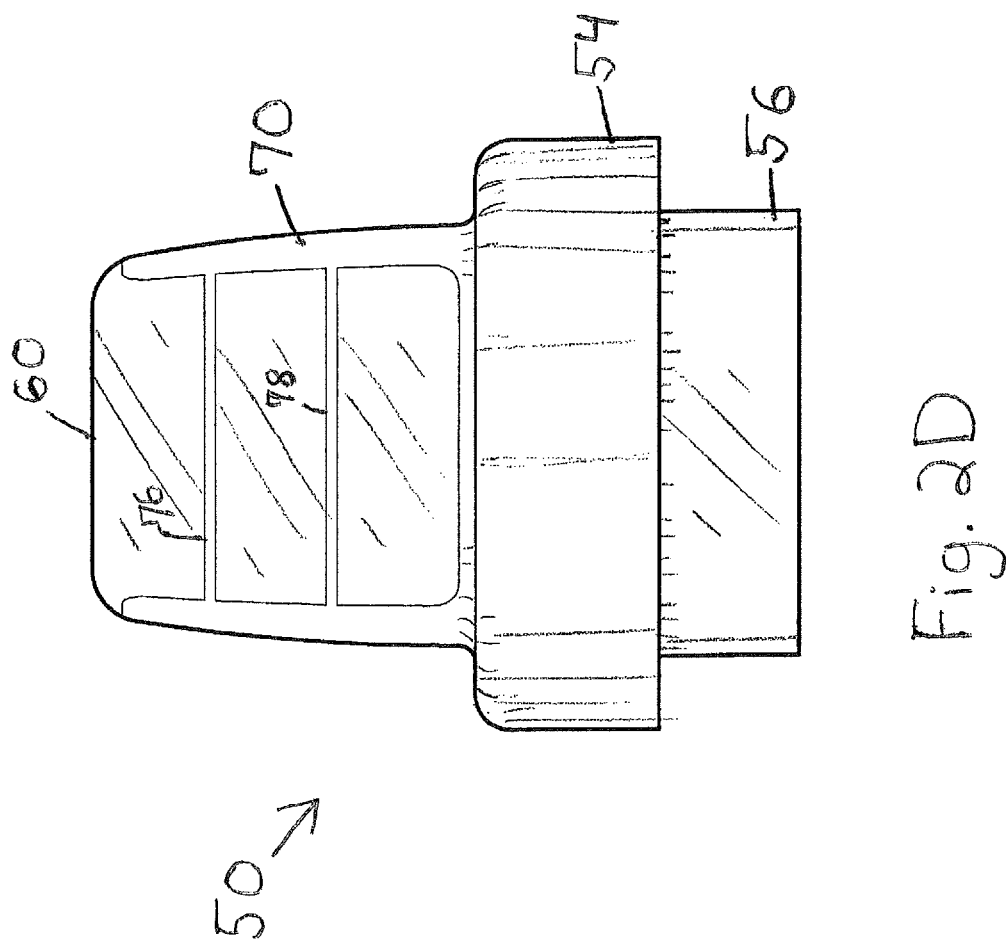
FIG. 3 illustrates a different film.
Figure 3:
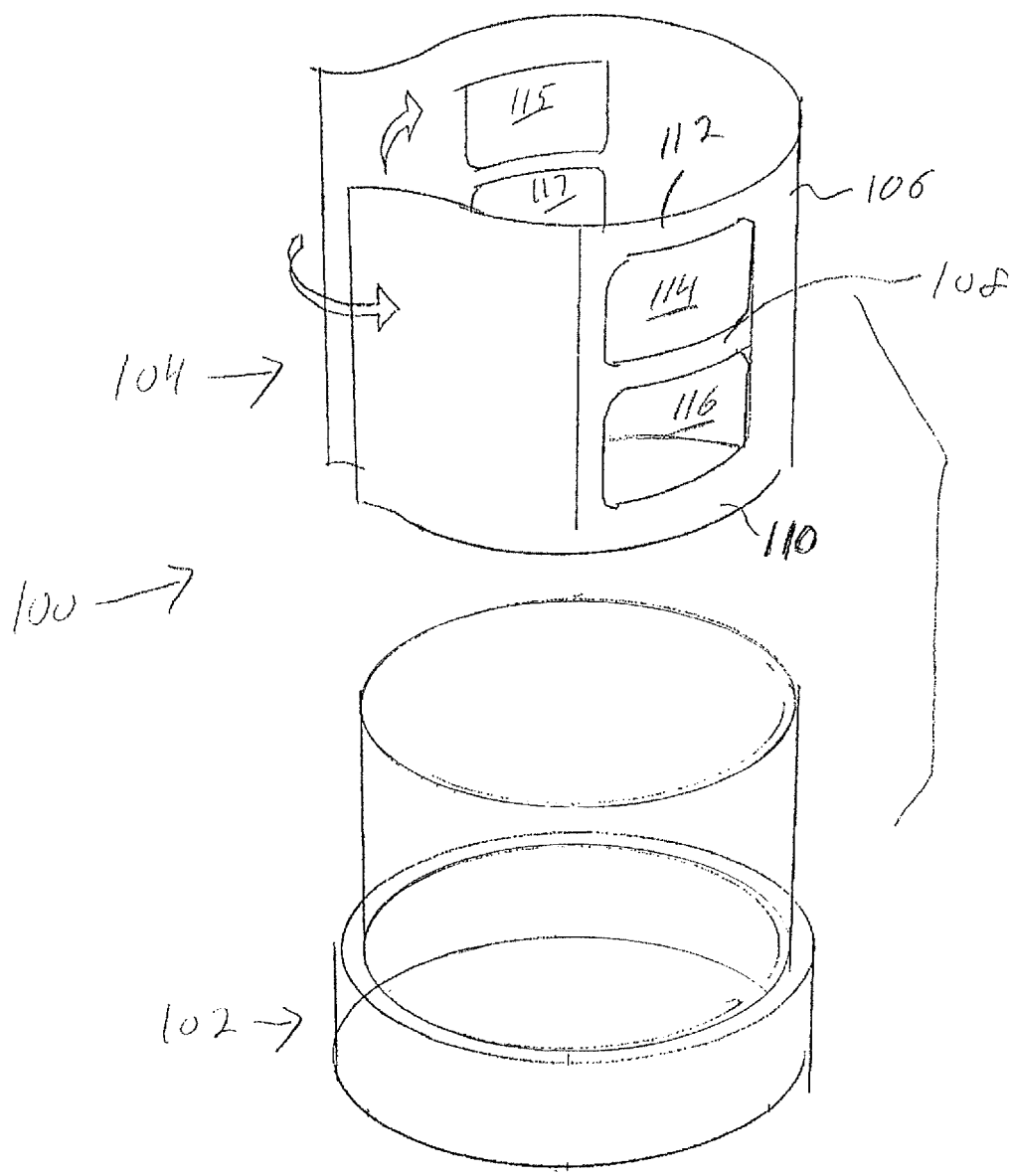

FIG. 3 shows another example and alternatives of the subject innovation. Measuring cup assembly 100 comprises cup/cover assembly 102 that is generally similar to cup 52, FIG. 2. Film 104 in this example is a wrap around film that is coupled to the cup by adhesion or shrink wrapping. This also shows opposed sets of windows 114 and 115, and 116 and 117. These windows are defined in a similar manner as described above by the opaque region 106 of film 104 extending in horizontal bands 108, 110, and 112. windows 114-117 can be clear or translucent areas of film 104, or one or more of them can be created by cutting out a portion of the film, for example through die cutting of the film before it is applied to the cup. Opposed windows such as shown here allow the user to see through the cup and also allows more light to enter into the interior the cup, both of which increase the visibility of the liquid level relative to the volume dispensing indicators.

FIG. 4 shows measuring cup assembly 120 which is similar to the cup shown in FIGS. 2 and 3 except that cup 122 defines a flat face 130 that carries the windows and volume indicators. This flat face can visually reinforce the volume indicator lines and also may provide better leverage for unscrewing the cover. This example also shows an angled lip or top edge 124 that defines pour spout 126 that helps to direct the contents out of the cup.

Figure 5A:
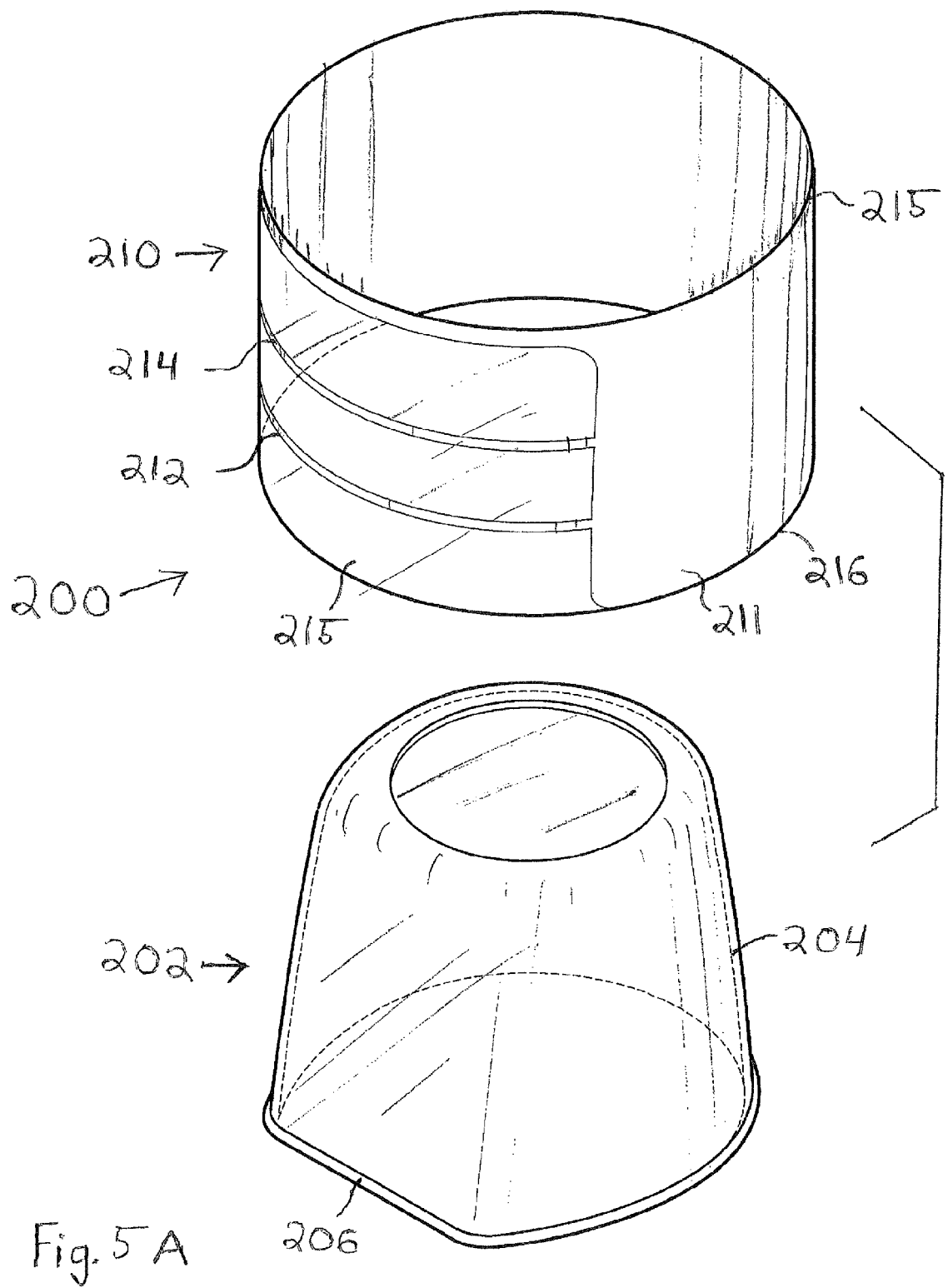
Figure 5C:
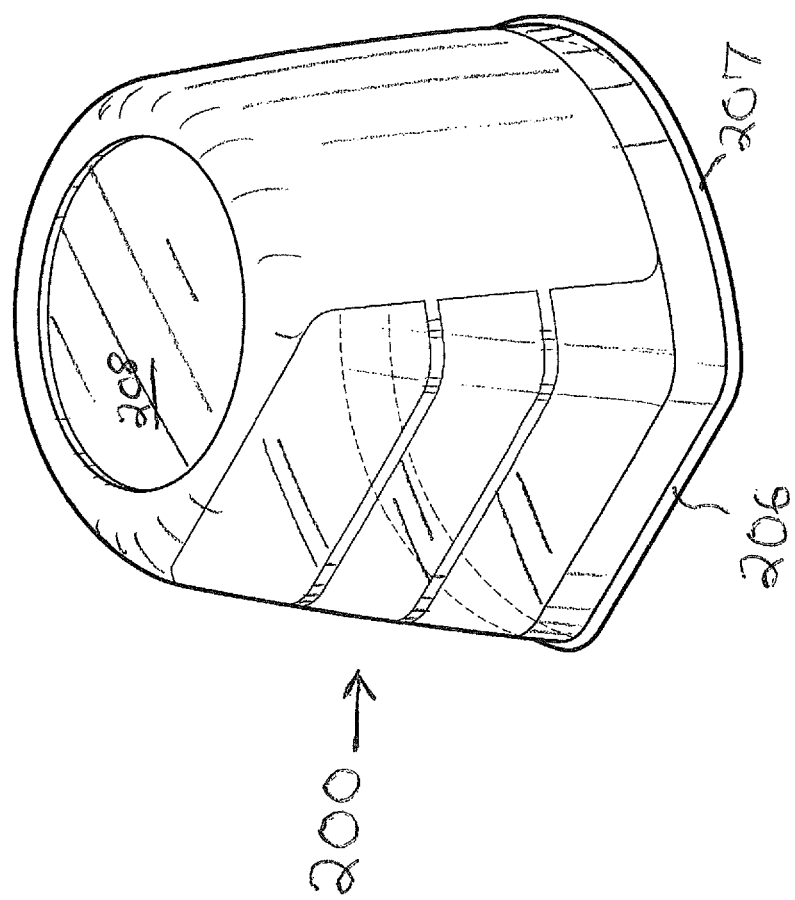
Figure 5E:
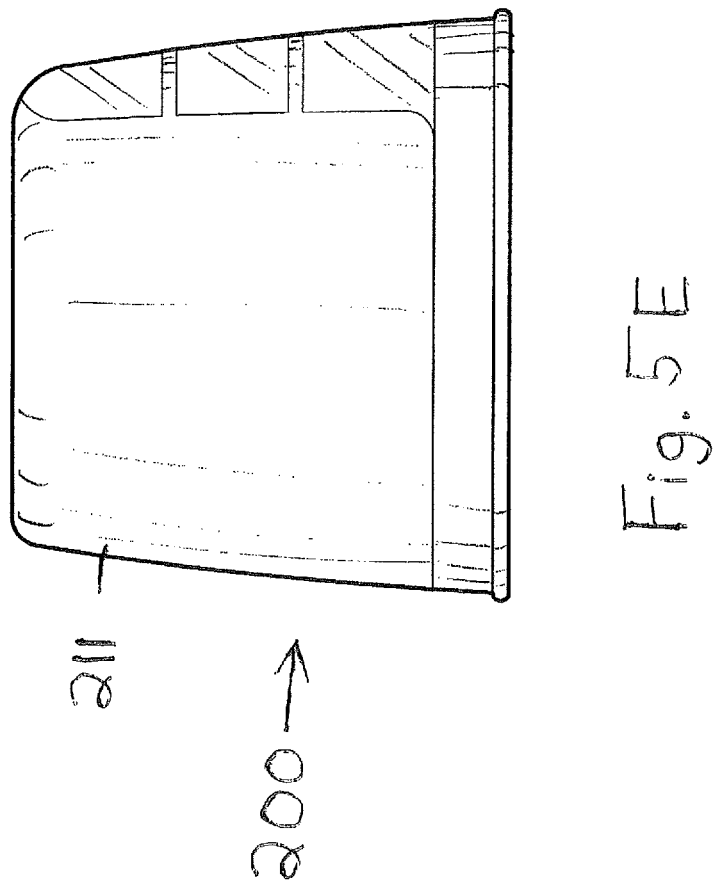
Figure 5F:
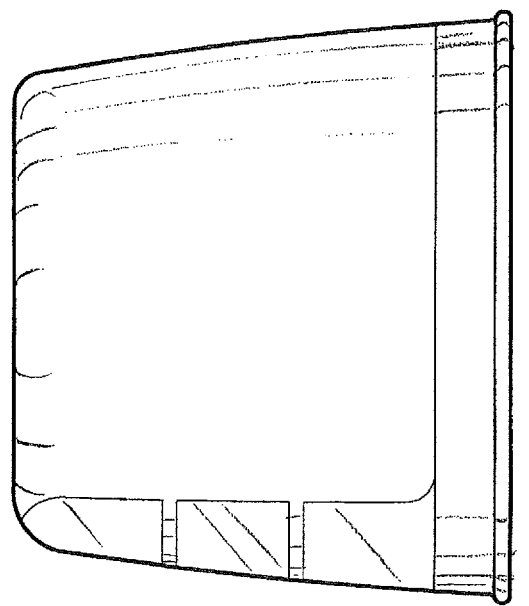
Figure 5G:
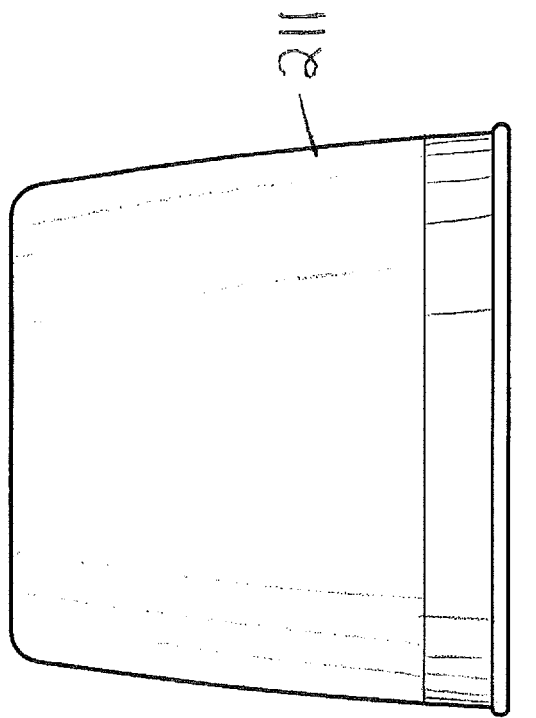
Figure 5H:
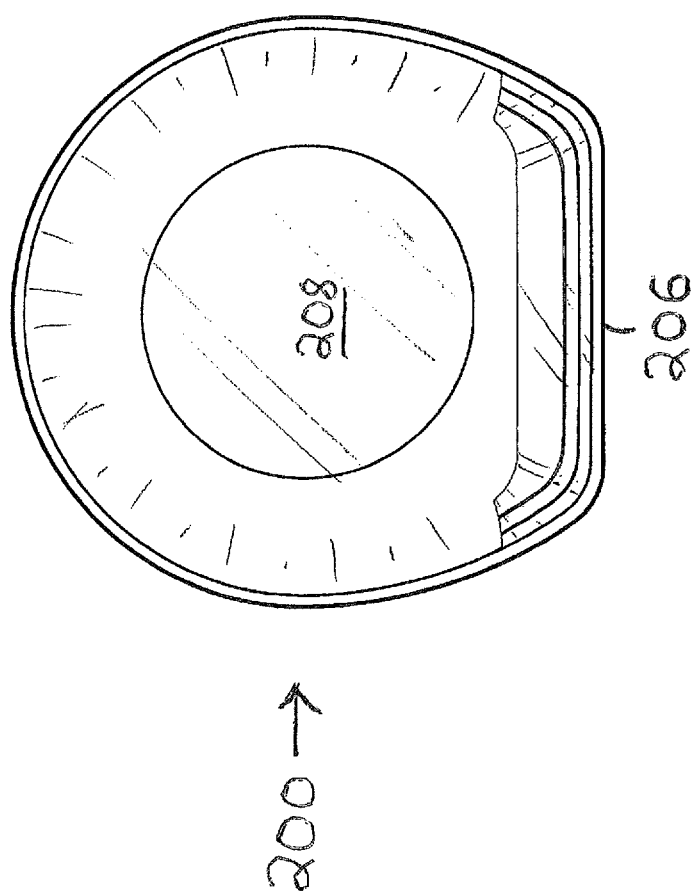
Figure 51:
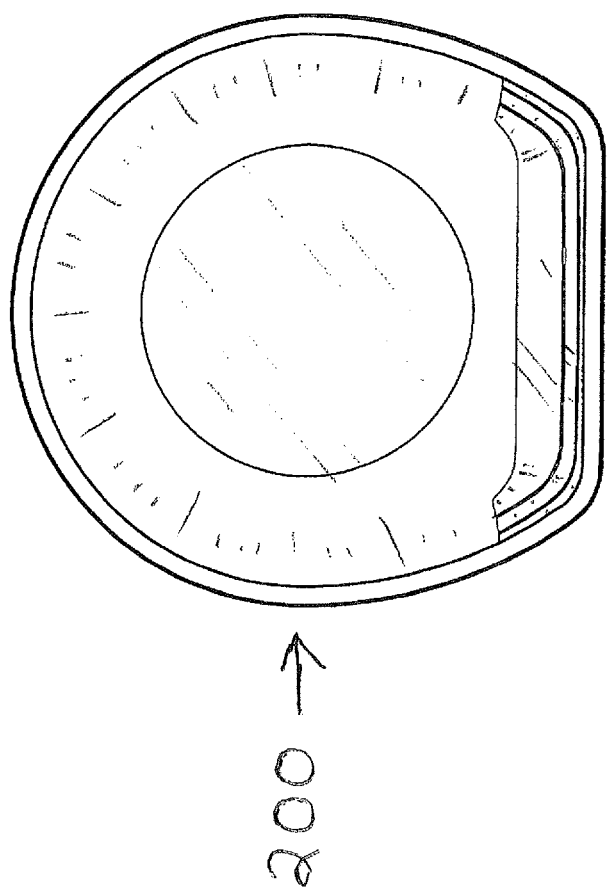

Another example is shown in FIGS. 5A-5I. In this case measuring cup assembly 200 includes clear measuring cup 202 with flat face 206 and the rest defined by a generally rounded body 204. Shrink wrap film 210 has opaque region 211 that includes volume dispensing indicators 212 and 214 that traverse clear area 215; this is accomplished by not printing the clear shrink wrap film in these areas. Film 210 is properly oriented to cup 202 so that volume indicators 212 and 214 pass across flat face 206 as shown in FIG. 5D. In this example, the film is shorter than the cup so that the bottom edge of the film 215 is located below top lip 203 of cup 202. This can accomplish an additional volume dispensing indicator where the film meets the cup.

The film at least partially covers the cup and defines one or more windows that focus a user's attention toward the viewable, transparent portion of the cup. The volume dispensing indicators are configured to guide a user to dispense a particular volume of material from the container. Each of the dispensing indicators are configured to guide the user to pouring an appropriate dosage of product from the container for a particular application. For example, assume the container holds a beverage concentrate. In such a case, the first dispensing indicator can indicate a volume of the concentrate to be added to a cup of water to make a single drink serving of while the second dispensing indicator can indicate the volume of the concentrate to be added to a half-gallon of water to make several drink servings. The user can fill the cover assembly with concentrate to either the first dispensing indicator or the second dispensing indicator depending upon the serving size desired.

In one arrangement, the second dispensing indicator is disposed on an extension portion of the cup. For example, the extension portion can be configured as a cylindrically shaped wall that extends past the lip of the cover assembly and, when the cover assembly is placed onto the container, extends into the container (i.e., into the volume defined by the container). The extension portion increases the overall volume of the cover assembly, thereby allowing the user to measure out relatively large volumes of product from the container. As a user fills the cover assembly with product from the container, the user can view both the product filling the cover assembly through the transparent extension portion and the relationship between the product, as it fills the cover assembly, and the dispensing indicators.

The film is configured to focus the user's attention toward the transparent portion of the measuring cup assembly. For example, the film can define a window that frames at least a portion of the transparent view element of the cup. For example, as illustrated in FIGS. 1A and 1B, transparent view element 30 is disposed relative to the film such that the first dispensing indicator 22 is viewable through the window 24. With such an arrangement, the window 24 allows a user to view the first dispensing indicator 22, as well as the dispensed fluid, from either the outside or inside of the cover assembly. Accordingly, the window allows the user to dispense an accurate amount of product from the container for a particular application.

The film and the cup can be combined in a variety of ways to form a cover assembly and/or measuring cup assembly. In one arrangement the film and the cup can be combined through a molding process, such as a two-shot molding process which results in an integrally formed cover assembly. Or, the film can be inserted into the mold and the clear cup molded against the film. Or the film can be applied after the cup is formed.

The transparent view elements can protrude or extending radially from the film. Also, in one arrangement, the transparent view elements are configured as being substantially flush with the film while in another arrangement they are configured as being substantially recessed relative to the film.

The film can be manufactured from a tinted or pigmented plastic material; in one non-limiting example the film is a shrink wrap plastic material that has one or more clear areas or regions that are traversed by the tinted volume indicating regions to thereby define windows. The shrink wrap material can be configured in a variety of ways. For example, it can be configured as a cylindrical shrink sleeve formed of a tinted material and having an untinted portion that defines the window. Or it can be a wrapped shrink sleeve formed of a tinted material and having an untinted portion that defines the window. Or the windows can be defined by openings in the film; the openings can have any desired shape such as rectangular, round or oval as three non-limiting examples.

In order to ensure a particular alignment of the window of the shrink wrap plastic material with the container feature such as label 5 of the container 12, the shrink wrap plastic film can be secured to the cup after the cup has been secured to the container. For example, once the cup has been secured to the container, the window can be aligned with container feature 5 and then the film can be secured (e.g., by shrinking) to the cap in the properly aligned orientation. The film can be designed to provide different aesthetics for different products while maintaining at least some of the functionality described herein.

While various embodiments of the invention have been particularly shown and described, it will be understood by those skilled in the art that various changes in form and details may be made therein without departing from the spirit and scope of the invention as defined by the appended claims.

What is claimed is:

1. A measuring cup assembly, comprising:
   a light-pervious cup;
   a film at least partially disposed on the cup, the film defining a light-impervious region and a light-pervious region, the cup at least partly viewable through the light-pervious region; and
   at least one volume dispensing indicator that is part of the light-impervious region of the film and that traverses a light-pervious region to create a visual demarcation, each volume dispensing indicator indicating a volume of product that has been dispensed into the cup;
   wherein the light-pervious region is configured to provide visual detection of the at least one volume dispensing indicator, as well as the dispensed product, from a side of the measuring cup assembly.

2. The measuring cup assembly of claim 1 wherein the cup carries threads that are constructed and arranged to engage mating threads carried by the container, so that the cup also acts as a cover assembly.

3. The measuring cup assembly of claim 2 wherein the cup defines an annular projecting lip and the threads are on the inside of the lip, and wherein the cup extends on both sides of the lip.

4. The measuring cup assembly of claim 1 wherein the at least one volume dispensing indicator comprises a first volume dispensing indicator and a second volume dispensing indicator.

5. The measuring cup assembly of claim 4 wherein the second volume dispensing indicator is disposed on an extension portion of the cup, the extension portion configured as a cylindrically shaped wall that extends past a lip of the cup.

6. The measuring cup assembly of claim 4 wherein both of the volume dispensing indicators traverse a light-impervious region of the film.

7. The measuring cup assembly of claim 6 wherein the cup defines a closed bottom and a top lip, and where the volume dispensing indicators comprise narrow straight film portions that are essentially parallel to the closed bottom.

8. The measuring cup assembly of claim 1 wherein the film comprises a generally opaque shrink-wrap film with a plurality of generally clear windows.

9. The measuring cup assembly of claim 8 wherein the film defines a first window and a second window, the second window radially opposing the first window.

10. The measuring cup assembly of claim 1 wherein the transparent cup comprises a substantially flat support portion surface on which a window is at least in part located.

11. The measuring cup assembly of claim 1 wherein the transparent cup comprises a substantially rounded support portion surface.

12. The measuring cup assembly of claim 1 wherein the cup comprises an extension portion configured as a cylindrically shaped wall that extends past a lip of the cup.

13. The measuring cup assembly of claim 1 wherein the film comprises a generally opaque shrink wrap plastic film material that defines a light-pervious window.

14. The measuring cup assembly of claim 13 wherein the shrink wrap plastic film material defines the window as a transparent portion of the shrink wrap plastic film material.

15. The measuring cup assembly of claim 14 wherein the shrink wrap plastic film material defines the window as an opening in the shrink wrap plastic film material.

16. The measuring cup assembly of claim 1 wherein the cup comprises at least one spout.

17. The measuring cup assembly of claim 1 wherein the at least one volume dispensing indicator comprises a substantially transparent shrink wrap film material having a tinted volume dispensing indicator disposed thereon.

18. The measuring cup assembly of claim 17 wherein the substantially transparent shrink wrap film material is disposed on the cup.

19. A measuring cup assembly, comprising:
   a clear plastic cup, wherein the cup defines a closed bottom and an annular projecting lip, with threads on the inside of the lip that are constructed and arranged to engage mating threads carried by the container so that the cup also acts as a cover assembly, and where the cup extends on both sides of the lip and comprises an extension portion configured as a cylindrically shaped wall that extends past a lip;
   a generally opaque shrink-wrap film disposed on the cup, the film defining a light-impervious region and one or more light-pervious windows that are clear regions of the film, the cup at least partly viewable through the windows; and
   at least two volume dispensing indicators that comprise narrow straight portions of the light-impervious region of the film that are essentially parallel to the closed bottom of the cup and that traverse the light-pervious region to create a visual demarcation, each volume dispensing indicator indicating a volume of product that has been dispensed into the cup;
   wherein the windows are configured to provide visual detection of the volume dispensing indicators, as well as the dispensed product, from a side of the measuring cup assembly.

20. A measuring cup assembly, comprising:
   a clear plastic cup with a closed bottom;
   a generally opaque shrink-wrap film disposed on the cup, the film defining a light-impervious region and one or more light-pervious windows that are clear regions of the film, the cup at least partly viewable through the windows; and
   at least two volume dispensing indicators that comprise narrow straight portions of the light-impervious region of the film that are essentially parallel to the closed bottom of the cup and that traverse the light-pervious region to create a visual demarcation, each volume dispensing indicator indicating a volume of product that has been dispensed into the cup;
   wherein the windows are configured to provide visual detection of the volume dispensing indicators, as well as the dispensed product, from a side of the measuring cup assembly.

* * * * *